United States Patent Office 2,862,926
Patented Dec. 2, 1958

2,862,926
SYNTHESIS OF STEROIDS

Gordon H. Thomas, New Brunswick, and Josef Fried, Princeton, N. J., assignors to Olin Mathieson Chemical Corporation, New York, N. Y., a corporation of Virginia No Drawing. Application December 6, 1957
Serial No. 700,943

1 Claim. (Cl. 260—239.55)

This invention relates to the synthesis of steroids and has for its object the provision of a new steroid of the formula

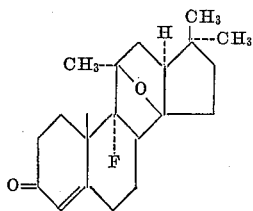

This new steroid is a physiologically active substance which possesses androgenic activity. Hence it can be used in lieu of known androgenic steroids, such as methyl testosterone, in the treatment of menopausal disturbances, being formulated for such administration in the same type of peroral preparations as methyl testosterone, for example, with concentration and/or dosage based on the activity of the particular compound.

The steroid of this invention is prepared by interacting 9$\beta$,11$\beta$-epoxy-11$\alpha$,17$\alpha$-dimethyltestosterone (prepared as described in our application, Serial No. 700,935, filed on even date herewith) with hydrogen fluoride.

The following example illustrates the invention:

EXAMPLE

9$\alpha$-fluoro-11$\alpha$,17$\alpha$,17$\beta$-trimethyl-11$\beta$,14$\beta$-epoxy-18-nor-
18-iso-$\Delta^4$-androstene-3-one Hydrogen fluoride is bubbled into a stirred solution of 290 mg. of 9$\beta$,11$\beta$-epoxy-11$\alpha$,17$\alpha$-dimethyltestosterone in 10 ml. of chloroform and 0.5 ml. of absolute ethanol at 0° C. The reaction mixture becomes cherry red in color and two phases are formed. At this point, passage of hydrogen fluoride is discontinued and the mixture is stirred at 0° C. for 80 minutes. The solution is neutralized by the careful addition of a suspension of sodium bicarbonate in water, and the steroids are then extracted with chloroform. The chloroform extract is washed with water, dried over sodium sulfate and evaporated to dryness in vacuo. The residue is dissolved in 5 ml. of benzene and absorbed on 3 g. of acid-washed alumina. Elution with chloroform-benzene (1:9; 250 ml.) followed by crystallization from acetone-hexane gives about 44 mg. of 9$\alpha$-fluoro-11$\alpha$,17$\alpha$,17$\beta$-trimethyl-11$\beta$,14$\beta$-epoxy-18-nor-18-iso-$\Delta^4$-androstene-3-one, M. P. about 156–158° C.; [$\alpha$]$_D$+48.5° (c, 1.11 in chloroform);

$\lambda_{max.}^{alc.}$ 238 m$\mu$ ($\epsilon$ = 16,700); $\lambda_{max.}^{Nujol}$ 5.97$\mu$, 6.18$\mu$ Analysis.—Calcd. for $C_{21}H_{29}O_2F$ (332.44): C, 75.87; H, 8.79; F, 5.72. Found: C, 75.49; H, 8.64; F, 5.86.

The invention may be variously otherwise embodied within the scope of the appended claim.

What is claimed is:
A steroid of the formula

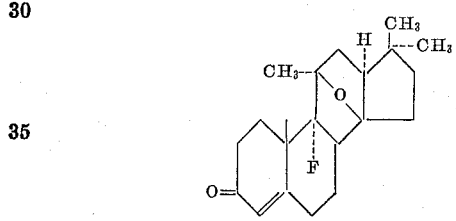

No references cited.